(12) United States Patent
Qian et al.

(10) Patent No.: US 8,021,561 B1
(45) Date of Patent: Sep. 20, 2011

(54) OPTICAL COMPONENT HAVING FEATURES EXTENDING DIFFERENT DEPTHS INTO A LIGHT TRANSMITTING MEDIUM

(75) Inventors: Wei Qian, Torrance, CA (US); Joan Fong, San Marino, CA (US); Dazeng Feng, Arcadia, CA (US)

(73) Assignee: Kotura, Inc., Monterey Park, CA (US)

( * ) Notice: Subject to any disclaimer, the term of this patent is extended or adjusted under 35 U.S.C. 154(b) by 302 days.

(21) Appl. No.: 12/321,368

(22) Filed: Jan. 16, 2009

(51) Int. Cl.
*B29D 11/00* (2006.01)
(52) U.S. Cl. ............... 216/24; 216/60; 216/72; 216/80; 216/97; 216/99
(58) Field of Classification Search .............. 216/24, 216/60, 72, 80, 97, 99
See application file for complete search history.

(56) References Cited

U.S. PATENT DOCUMENTS

| | | | |
|---|---|---|---|
| 6,553,160 B2 * | 4/2003 | Cao | 385/24 |
| 6,563,977 B1 * | 5/2003 | Chen et al. | 385/24 |
| 6,657,723 B2 * | 12/2003 | Cohen et al. | 356/328 |
| 6,735,362 B1 * | 5/2004 | Soskind | 385/37 |
| 7,151,635 B2 | 12/2006 | Bidnyk et al. | |
| 7,248,755 B2 | 7/2007 | Sappey et al. | |
| 7,409,123 B1 | 8/2008 | Feng et al. | |
| 2007/0086703 A1 * | 4/2007 | Kirk et al. | 385/37 |
| 2007/0160321 A1 * | 7/2007 | Wu et al. | 385/24 |
| 2007/0189669 A1 * | 8/2007 | Tormen et al. | 385/37 |
| 2008/0002933 A1 * | 1/2008 | Singh et al. | 385/24 |
| 2009/0087137 A1 * | 4/2009 | Doan | 385/14 |

OTHER PUBLICATIONS

Densmore, A., "DWDM data receiver based on monolithic integration of an Echelle grating demultiplexer and waveguide photodiodes," Electronics Letters, vol. 41, No. 13 (2005).
Doi, Y. et.al, "Flat and high responsivity CWDM photoreceiver using silica-based AWG with multimode output waveguide," Electronics Letters, vol. 39, No. 22 (2003).
Janz, S., "Planar waveguide Echelle gratings in silica-on-silicon," IEEE Photonics technology letters, vol. 16, No. 12, 503-505(2004).
McGreer, K.A., "Diffraction from concave gratings in planar waveguides," IEEE Photonics technology letters, vol. 7, No. 3, 324-326(1995).
Zhimin Shi, "A Hybrid diffraction method for design of etched diffraction grating demultiplexers," J. Lightwave Technology, vol. 23, No. 3, 1426-1434 (2005).

* cited by examiner

*Primary Examiner* — Binh X Tran
(74) *Attorney, Agent, or Firm* — Gavrilovich, Dodd & Lindsey, LLP

(57) ABSTRACT

The optical device includes a plurality of waveguides and an optical grating. A first portion of the waveguides act as input waveguide configured to carry a light beam that includes multiple light signals to the optical grating. The optical grating is configured to demultiplex the light signals. A second portion of the waveguides act as output waveguides configured to carry the demultiplexed light signals away from the optical grating. A method of forming the optical device includes sequentially forming the waveguides and the optical grating while a single mask defines the location of the waveguides and the optical grating.

15 Claims, 5 Drawing Sheets

OPTICAL COMPONENT HAVING FEATURES EXTENDING DIFFERENT DEPTHS INTO A LIGHT TRANSMITTING MEDIUM

FIELD

The present invention relates to optical devices and more particularly to optical devices used in communications applications.

BACKGROUND

Optical devices used in communications applications often have a light-transmitting medium positioned on a base. Optical gratings for separating light signals of different wavelengths are often formed in the light-transmitting medium. Waveguides for guiding the light signals can also be defined in the light-transmitting medium. A first portion of these waveguides can serve as input waveguides that carry the light signals to the optical grating and a second portion of these waveguides can serve as output waveguides that carry the separated light signals away from the optical grating. In order to reduce optical loss and cross-talk, the waveguides and the optical grating must be precisely aligned.

The waveguides and the optical grating are often defined by surfaces that are etched into the light transmitting medium. However, these surfaces must often be etched to different depths. As a result, the surfaces are often formed in series. For instance, surfaces that define the waveguides can be formed before or after surfaces that define the grating. However, in order to keep the precise alignment between the waveguides and the grating, the sequentially formed surfaces also must be precisely aligned. The difficulty in achieving alignment between sequentially formed surfaces is a source of optical loss in these devices.

For the above reasons, there is a need for an improved method of fabricating surfaces of these optical devices to different depths.

SUMMARY

A method of forming an optical device includes forming a first mask on a device precursor having a light-transmitting medium positioned on a base. The first mask protects a free space region of the device precursor while leaving exposed a grating recess region of the device precursor and also while leaving exposed trench regions of the device precursor. The grating recess region is a region of the light-transmitting medium where a grating recess is to be formed. The trench regions are regions of the light-transmitting medium where trenches are to be formed. The free space region spans the gap between the trench regions and the grating recess region.

The method also includes forming the trenches while protecting the grating recess region or while protecting the grating recess. The trenches each including one or more waveguide surfaces. Each waveguide surface defines a portion of one or more waveguides on the optical device. The method further includes forming the grating recess while protecting the trench regions or while protecting the trenches. The grating recess includes a reflective surface of an optical grating. The reflective surface is configured to receive light signals from one or more of the waveguides and to reflect the received light signals such that the light signals are demultiplexed as the light signals travel away from the reflective surface. A portion of the waveguides are configured to receive the demultiplexed light signals. The waveguide surfaces extend a different depth into the light-transmitting medium than the reflective surface extends into the light-transmitting medium. The first mask is present on the device while forming the grating recess and also while forming the trench regions.

BRIEF DESCRIPTION OF THE FIGURES

FIG. 1A is a topview of the device.

FIG. 1B is a cross-section of the device shown in FIG. 1A taken along the line labeled B.

FIG. 1C is a cross-section of the device shown in FIG. 1B taken along the line labeled C.

FIG. 2A is a topview of the device precursor.

FIG. 2B is a cross section of the device precursor shown in FIG. 2A taken along the line labeled B in FIG. 2A.

FIG. 2C is a cross section of the device precursor shown in FIG. 2A taken along the line labeled C in FIG. 2C.

FIG. 3A is a topview of the device precursor.

FIG. 3B is a cross section of the device precursor shown in FIG. 3A taken along the line labeled B in FIG. 3A.

FIG. 3C is a cross section of the device precursor shown in FIG. 3A taken along the line labeled C in FIG. 3C.

FIG. 4A is a topview of the device precursor.

FIG. 4B is a cross section of the device precursor shown in FIG. 4A taken along the line labeled B in FIG. 4A.

FIG. 4C is a cross section of the device precursor shown in FIG. 4A taken along the line labeled C in FIG. 4C.

DESCRIPTION

The optical device includes a plurality of waveguides and an optical grating. A first portion of the waveguides act as input waveguide configured to carry a light beam that includes multiple light signals to the optical grating. The optical grating is configured to demultiplex the light signals. A second portion of the waveguides act as output waveguides configured to carry the demultiplexed light signals away from the optical grating.

A method of forming the optical device includes sequentially forming the waveguides and the optical grating. Despite the sequential formation of the waveguides and the optical grating, the method allows a single mask to define the location of the waveguides and the optical grating. Since a single mask defines the locations of the waveguides and the optical gratings, the single mask also provides the alignment of the waveguides and the optical grating. As a result, the method increases the simplicity and accuracy of achieving alignment between the waveguides and the optical grating.

Figure 1A:
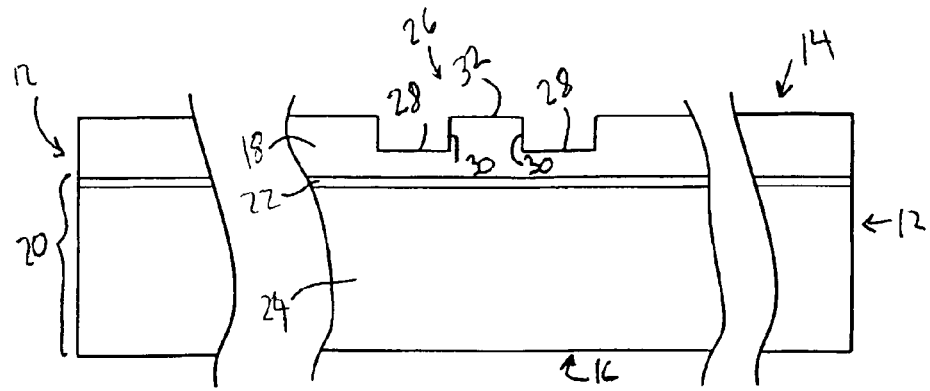
FIG. 1A through FIG. 1C illustrate an optical device that includes input waveguides configured to carry multiple light signals to an optical grating. The optical grating is configured to demultiplex the light signals. The device includes output waveguides configured to carry the demultiplexed light signals away from the optical grating.
Figure 1B:
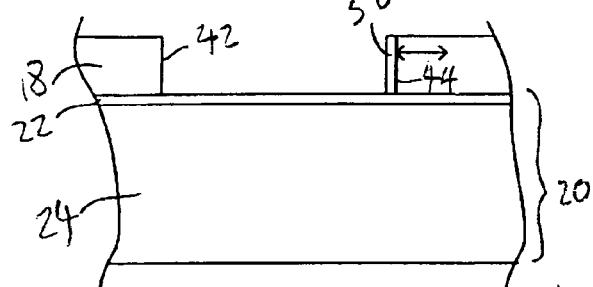
Figure 1C:
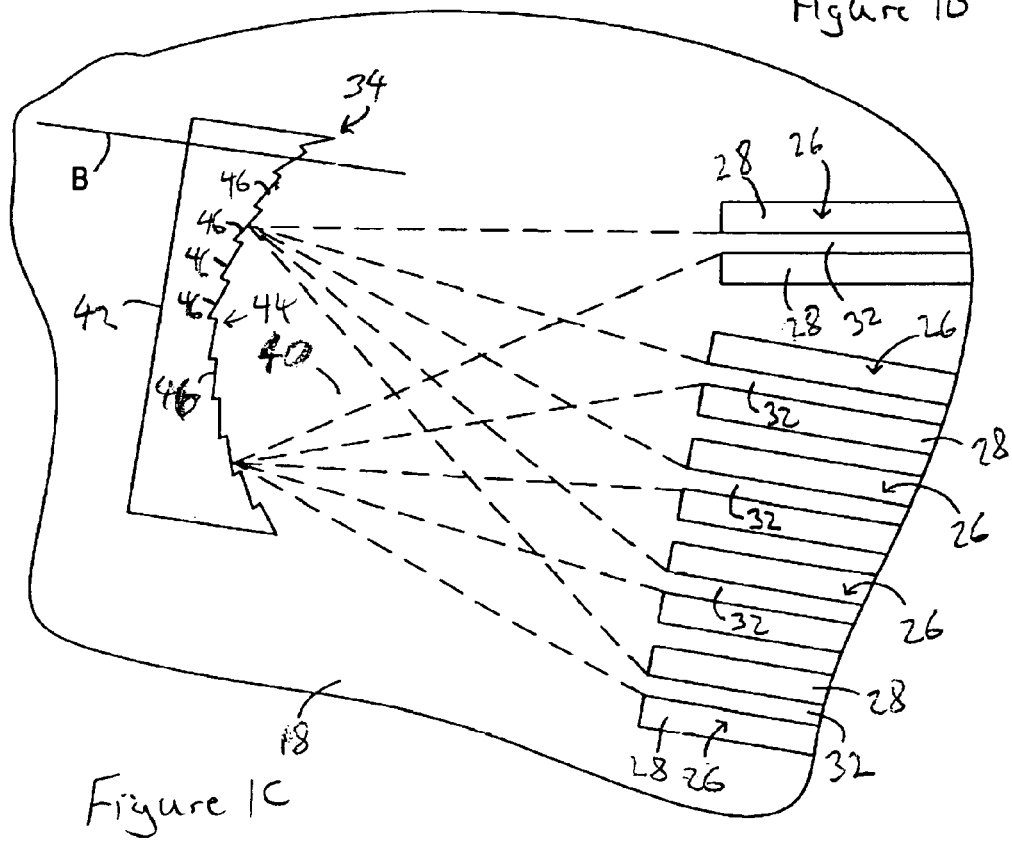

FIG. 1A through FIG. 1C illustrate an optical device. FIG. 1A is a topview of the device. FIG. 1B is a cross-section of the device shown in FIG. 1A taken along the line labeled B. FIG. 1C is a cross-section of the device shown in FIG. 1B taken along the line labeled C. The device is within the class of optical devices known as planar optical devices. These devices typically include one or more waveguides immobilized relative to a substrate or a base. The direction of propagation of light signals along the waveguides is generally parallel to a plane of the device. Examples of the plane of the device include the top side of the base, the bottom side of the base, the top side of the substrate, and/or the bottom side of the substrate.

The illustrated device includes lateral sides 12 (or edges) extending from a top side 14 to a bottom side 16. The propagation direction of light signals along the length of the waveguides on a planar optical device generally extend through the lateral sides 12 of the device. The top side 14 and the bottom side 16 of the device are non-lateral sides.

The device includes a light-transmitting medium 18 positioned on a base 20. The portion of the base 20 adjacent to the light-transmitting medium 18 is configured to reflect light signals from the light-transmitting medium 18 back into the light-transmitting media in order to constrain light signals in the light-transmitting medium 18. For instance, the portion of the base 20 adjacent to the light-transmitting medium 18 can be an optical insulator 22 with a lower index of refraction than the light-transmitting medium 18. The drop in the index of refraction can cause reflection of a light signal from the light-transmitting medium 18 back into the light-transmitting medium 18. Suitable light-transmitting media include, but are not limited to, silicon, polymers, silica, SiN, GaAs, InP and $LiNbO_3$.

The base 20 can include an optical insulator 22 positioned on a substrate 24. As will become evident below, the substrate 24 can be configured to transmit light signals. For instance, the substrate 24 can be constructed of a second light-transmitting medium that is different from the light-transmitting medium 18 or the same as the light-transmitting medium 18. The illustrated device is constructed on a silicon-on-insulator wafer. A silicon-on-insulator wafer includes a silicon layer that serves as the light-transmitting medium 18. The silicon-on-insulator wafer also includes a layer of silica positioned on a silicon substrate 24. The layer of silica can serve as the optical insulator 22 and the silicon substrate 24 can serve as the substrate 24.

The device includes waveguides 26. Trenches 28 that extend part way into the light-transmitting medium 18 each include one or more waveguide surfaces 30. Each waveguide surface 30 defines a ridge 32 that defines a portion of a waveguide 26. For instance, the ridges 32 and the base 20 define a portion of a light signal-carrying region where light signals are constrained within each of the waveguides 26. When the device is constructed on a silicon-on-insulator wafer, the silica that serves as the insulator 22 has an index of refraction that is less than an index of refraction of the silicon light-transmitting medium 18. The reduced index of refraction prevents the light signals from entering the substrate 24 from the silicon. Different waveguides 26 on the device can have different dimensions or the same dimensions.

The device includes an optical grating 34 such as reflection grating. A first portion of the waveguides 26 act as input waveguide configured to carry a light beam that includes multiple light signals to the optical grating 34. A second portion of the waveguides 26 act as output waveguides configured to carry light signals away from the optical grating 34.

The optical grating 34 is configured to receive a light beam that includes multiplexed light signals from one or more of the input waveguides. The optical grating 34 demultiplexes the light signals such that different light signals are received at different output waveguides. The device can be constructed such that only one of the demultiplexed light signals is received at each output waveguide or such that more than one of the demultiplexed light signals is received at one or more of the output waveguides. A suitable optical grating 34 includes, but is not limited to, reflection gratings. A particular example of a reflection grating is an echelle grating. The illustrated optical grating 34 is an echelle grating.

The grating includes a free space region 40 and a grating recess 42. The grating recess 42 is partially defined by surfaces that include a reflective surface 44 defined in the light-transmitting medium 18. For instance, the optical device can include a grating recess 42 extending into the light-transmitting medium 18. During operation of the device, a beam from an input waveguide enters the free space region 40. The beam includes multiple light signals. The path of the light through the free space region 40 is illustrated as dashed lines in FIG. 1A in order to distinguish the light from other features of the device. The light signals travel through the free space region 40 and are received at the reflective surface 44. The light signals are reflected off of the reflective surface 44.

The details of the reflective surface 44 are not shown in order to simplify the illustration of FIG. 1A through FIG. 1C. However, the reflective surface 44 of an echelle grating includes a plurality of stepped reflecting surfaces 46. The primary portion of the stepped reflecting surfaces 46 that reflects the light signals can be substantially flat or can be a curve such as an elliptical curve. The reflecting surface 46 are configured such that light of different wavelengths separates as it travels away from the reflective surface 44. Accordingly, the echelle grating demultiplexes the beam into individual light signals, or channels, traveling away from the reflective surface 44. The channels are received at the output waveguides. FIG. 1A illustrates the output waveguides configured such that each of the channels is received on a different one of the output waveguides.

A reflecting material 50 can optionally be formed on the reflective surface 44. Suitable reflecting materials 50 include, but are not limited to, metals.

As is evident from a comparison of FIG. 1B with FIG. 1C, the waveguide surfaces 30 extend a different depths into the light transmitting medium than the reflective surface 44 of the optical grating 34. For instance, FIG. 1B illustrates the trenches 28 extending only part way into the light transmitting medium while FIG. 1C illustrates the grating recess 42 extending through the light transmitting medium. Since the sides of the trenches 28 define a portion of the waveguides 26 and the reflective surface 44 defines a portion of the optical grating 34, the surfaces that define the waveguides 26 and the surfaces that define the optical grating 34 extend different depths into the light transmitting medium.

The different depths result from the light signals being present in the entire height of the light transmitting medium rather than in only the ridges 32. As a result, if the reflective surface 44 extended the same depth into the light transmitting medium as the waveguide surfaces 30, the portion of the light signal below the waveguide surfaces 30 would not be reflected by the reflective surface 44. The additional depth of the reflective surface 44 serves to reflect the portion of the light signal that is below the level of the trenches 28.

Although not illustrated, a fourth light-transmitting medium 18 is optionally positioned on the light-light transmitting medium. The fourth light-transmitting medium 18 can serve as a cladding for the waveguide 26 and/or for the device. When the light-transmitting medium 18 is silicon, suitable fourth light-transmitting media include, but are not limited to, silicon, polymers, silica, SiN, GaAs, InP and LiNbO$_3$.

Increasing the precision of the alignment between the waveguides 26 and the optical grating 34 can reduce optical loss and cross talk. FIGS. 2A to 4C illustrate a method of forming an optical device according to FIGS. 1A through 1C. The method is illustrated on a portion of a silicon-on-insulator chip, however, the method can also be executed using other chips and/or wafers. Accordingly, the chip and/or wafer can serve as a device precursor. The method results in the desired level of alignment between the waveguides 26 and the optical grating 34.

Figure 2A:
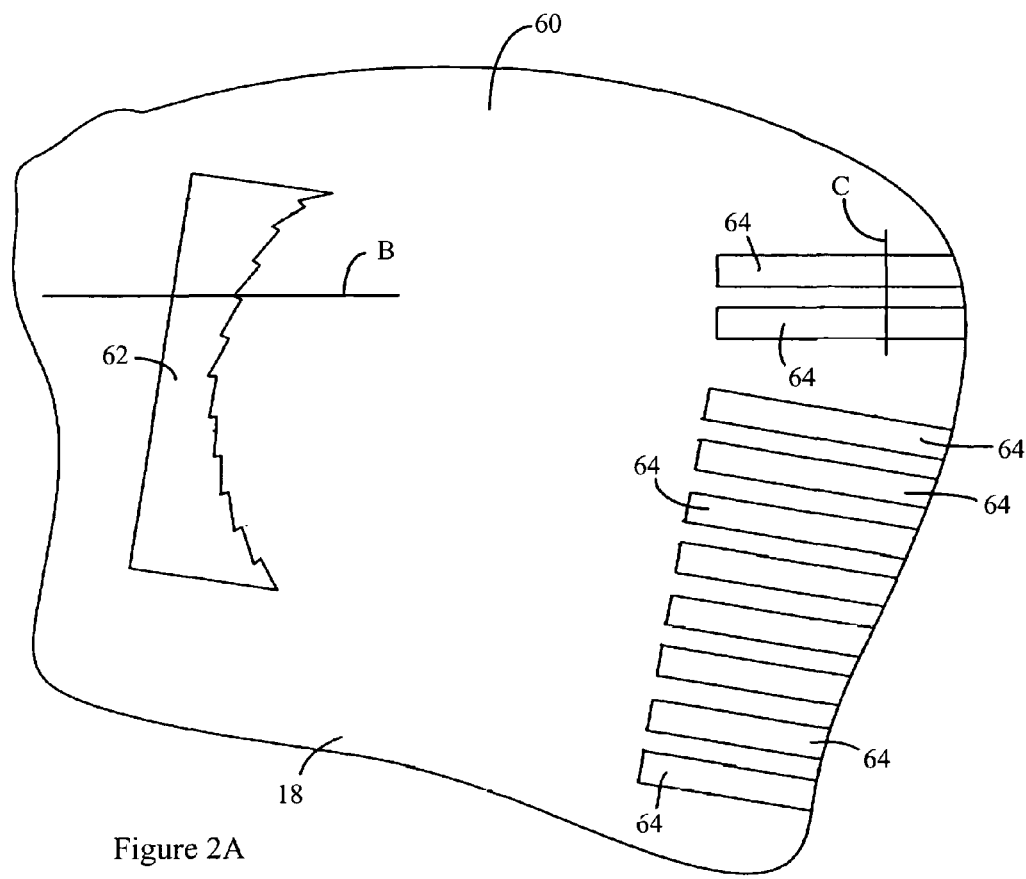
FIG. 2A through FIG. 2C illustrate a portion of a device precursor upon which the waveguides and optical grating is formed. A first mask is formed on the device precursor. The first mask leaves exposed a recess region of the device precursor and trench regions of the device precursor.
Figure 2B:
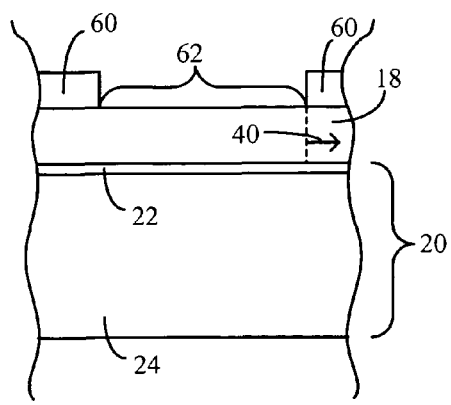
Figure 2C:
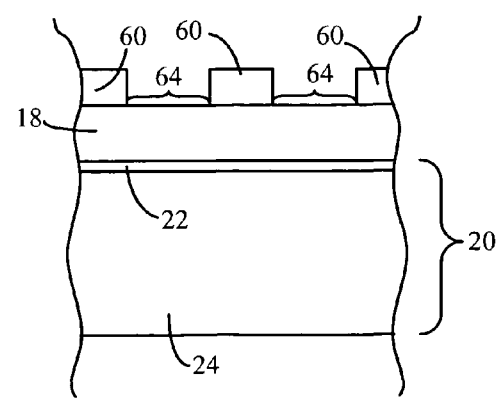

FIG. 2A through FIG. 2C illustrate a portion of a device precursor upon which the waveguides 26 and optical grating 34 is formed. FIG. 2A is a topview of the device precursor. FIG. 2B is a cross section of the device precursor shown in FIG. 2A taken along the line labeled B in FIG. 2A. FIG. 2C is a cross section of the device precursor shown in FIG. 2A taken along the line labeled C in FIG. 2C.

A first mask 60 is formed on the device precursor. The first mask 60 leaves exposed a grating recess region of the device precursor and trench regions 64 of the device precursor. The grating recess region 62 is the region of the device precursor where the grating recess 42 is to be formed. The trench regions 64 are regions of the light-transmitting medium 18 where the trenches 28 are to be formed. The first mask 60 also protects a free space region 40 of the device precursor. The free space region 40 spans a gap between the trench regions 64 and the grating recess region 62. As will become evident below, the waveguide surfaces 30 and the reflective surface 44 are etched sequentially. However, the first mask 60 will define the position of the waveguide surfaces 30 and the reflective surface 44. Since a single mask defines the positions of the waveguides 26 and the optical grating 34, the alignment of the waveguides 26 and gratings that is present on the first mask 60 is transferred to the final device.

Figure 3A:
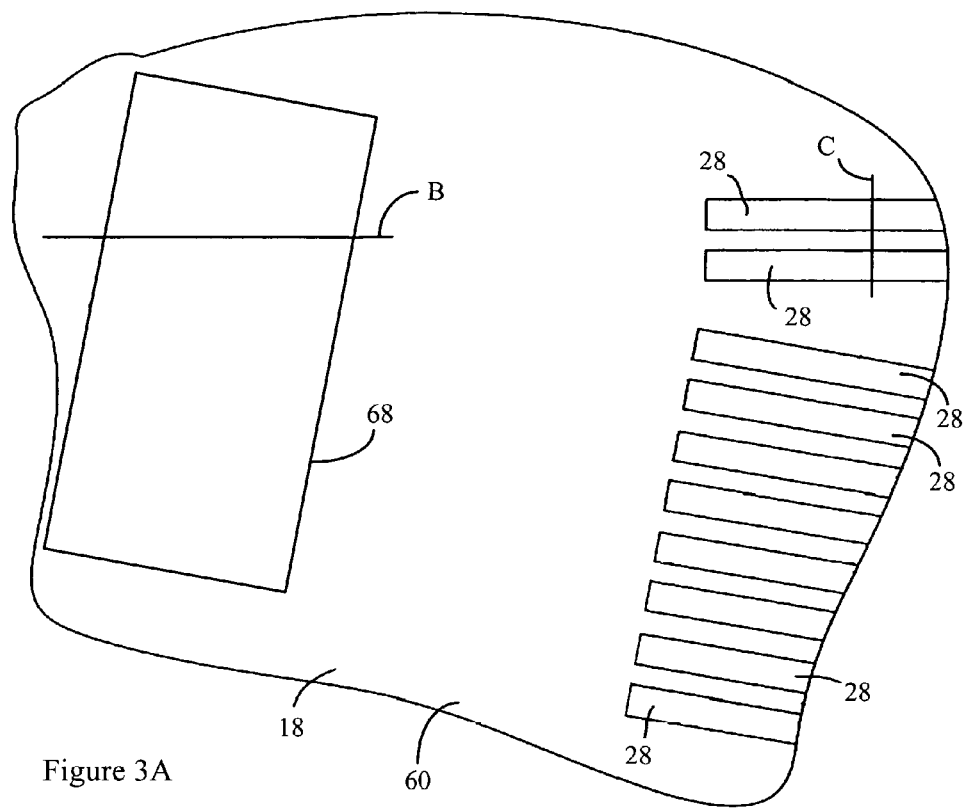
FIG. 3A through FIG. 3C illustrate a second mask formed over the first mask on the device precursor of FIG. 2A through FIG. 2C.
Figure 3B:
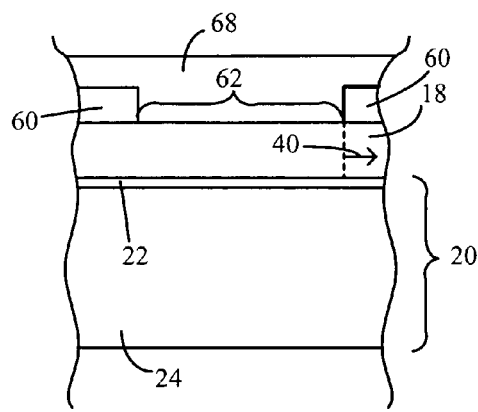
Figure 3C:
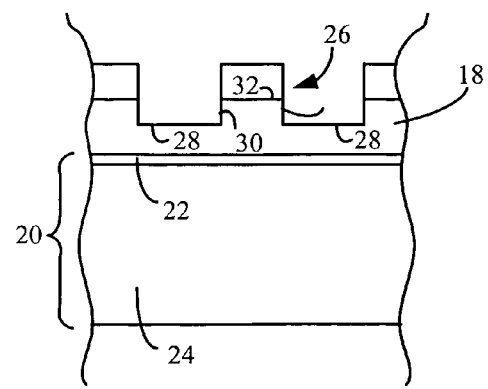

A suitable first mask 60 includes, but is not limited to, a hard mask such as a silica mask. A silica mask can be formed on the device precursor by thermally growing the silica on the top side of the device precursor followed by forming a photoresist on the silica. The photoresist can be formed with the pattern that is desired for the silica. The device precursor can then be etched and the photoresist removed to provide the patterned silica that serves as the first mask 60. Suitable etches include, but are not limited to, dry or wet etches and either istotropic or anisotropic etches A second mask 68 is formed on the device precursor of FIG. 2A through FIG. 2C as shown in FIG. 3A through FIG. 3C. FIG. 3A is a topview of the device precursor. FIG. 3B is a cross section of the device precursor shown in FIG. 3A taken along the line labeled B in FIG. 3A. FIG. 3C is a cross section of the device precursor shown in FIG. 3A taken along the line labeled C in FIG. 3C.

As is evident from FIG. 3A through FIG. 3C, the second mask 68 protects the grating recess region 62 of the device precursor while leaving the trench regions 64 exposed. The first mask 60 is left intact on the device precursor during the formation of the second mask 68. As a result, the regions of the device precursor that were originally protected by the first mask 60 remain protected by the first mask 60. Further, the second mask 68 is formed such that the first mask 60 continues to define the locations of the trench regions 64. As is evident form FIG. 3B, at least a portion of second mask 68 is positioned over the first mask 60.

After formation of the second mask 68, the waveguide surfaces 30 are formed by etching the device precursor to the depth that is desired for the trenches 28. For instance, the device precursor can be etched so as to provide the device precursor illustrate in FIG. 3A through FIG. 3C. As is most evident from FIG. 3C, the etch forms the trenches 28 and accordingly defines the locations of the waveguides 26 on the device precursor. Since the first mask 60 defines the locations of these trenches 28, the first mask 60 defines the locations of the waveguides 26. Suitable etches include, but are not limited to, dry or wet etches and either istotropic or anisotropic etches.

Figure 4A:
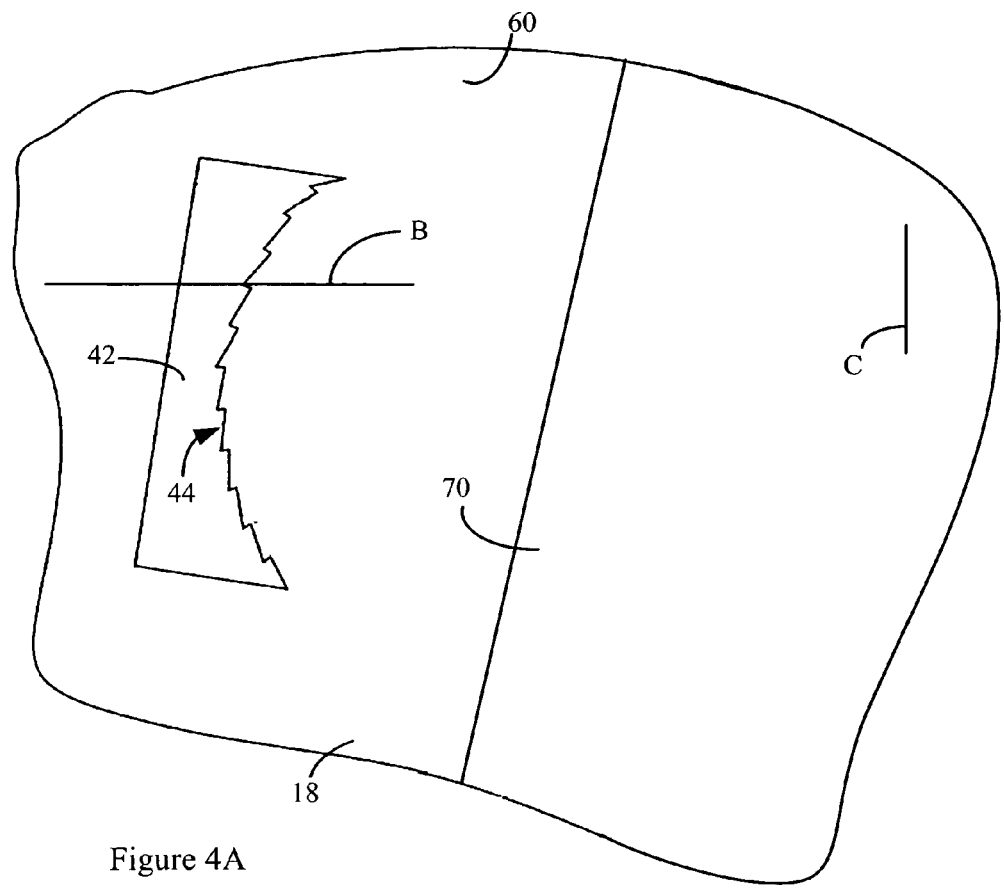
FIG. 4A through FIG. 4C illustrate a third mask is formed on the device precursor of FIG. 3A through FIG. 3C after removal of the second mask.
Figure 4B:
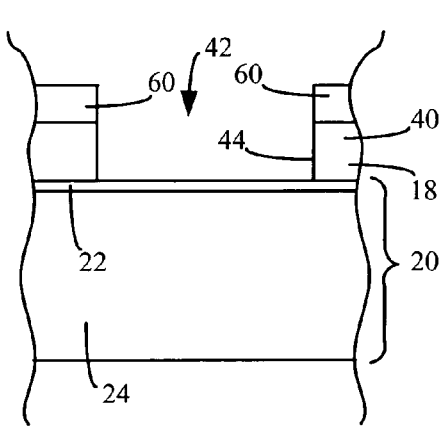
Figure 4C:
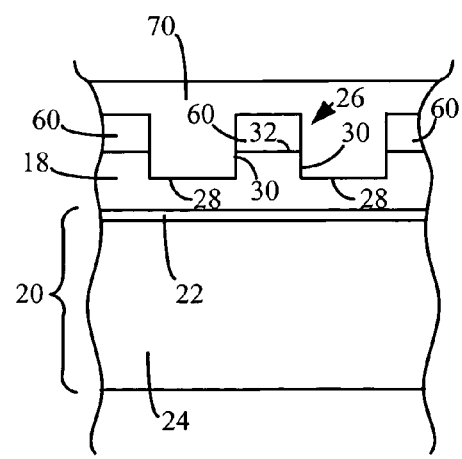

The second mask 68 is removed. After removal of the second mask 68, a third mask 70 is formed on the device precursor as shown in FIG. 4A through FIG. 4C. FIG. 4A is a topview of the device precursor. FIG. 4B is a cross section of the device precursor shown in FIG. 4A taken along the line labeled B in FIG. 4A. FIG. 4C is a cross section of the device precursor shown in FIG. 4A taken along the line labeled C in FIG. 4C.

As is evident from FIG. 4A through FIG. 4C, the third mask 70 protects the waveguides 26 while leaving the grating recess region 62 exposed. The first mask 60 is left intact on the device precursor during the formation of the third mask 70. As a result, the regions of the device precursor that were originally protected by the first mask 60 remain protected by the first mask 60. Further, the third mask 70 is configured such that the first mask 60 continues to define the location of the grating recess 42. As is evident form FIG. 4B, at least a portion of third mask 70 is positioned over the first mask 60.

After formation of the third mask 70, the device precursor is etched to the desired depth of the grating recess 42. For instance, the device precursor can etched so as to provide the device precursor illustrate in FIG. 4A through FIG. 4C. As is most evident from FIG. 4C, the etch forms the grating recess 42 and accordingly defines the locations of the grating on the device precursor. Since the first mask 60 defines the location of the grating recess 42 during the etch, the first mask 60 defines the locations of both the grating recess 42 and the waveguides 26 on the optical device. Suitable etches include, but are not limited to, dry or wet etches and either istotropic or anisotropic etches The third mask 70 and the fourth mask can be removed in order to provide the device of FIG. 1A through FIG. 1C.

Figure 5A:
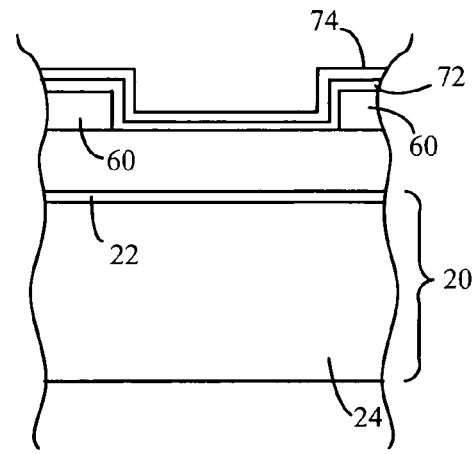
FIG. 5A through FIG. 5F illustrate a method of forming the third mask as a hard mask that includes a silica layer and a nitride layer.
Figure 5B:
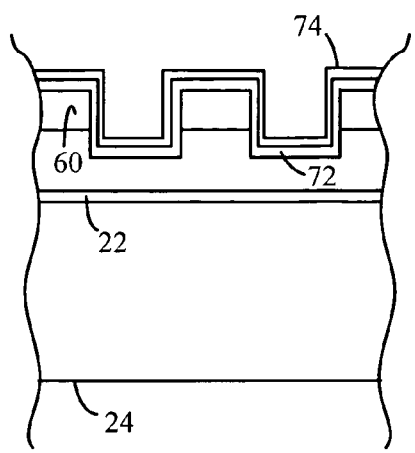
Figure 5C:
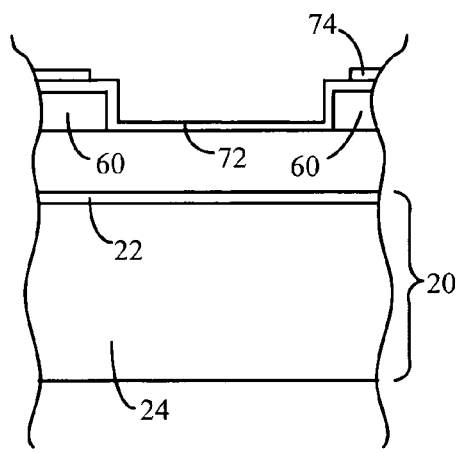
Figure 5D:
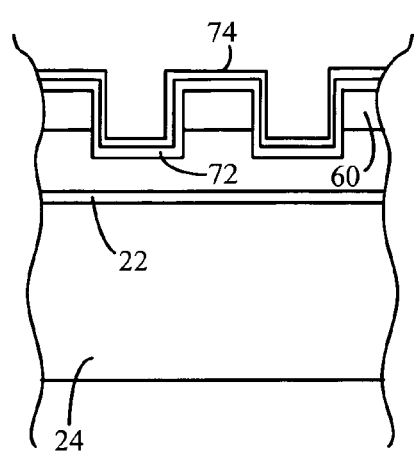
Figure 5E:
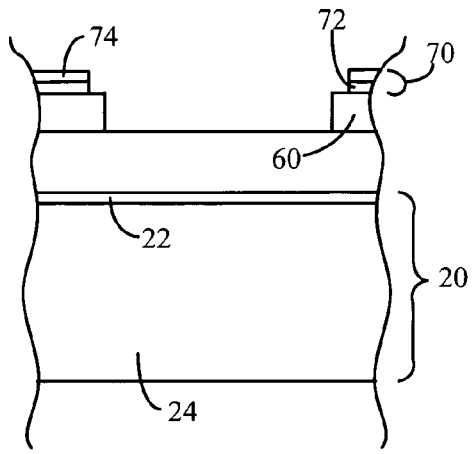
Figure 5F:
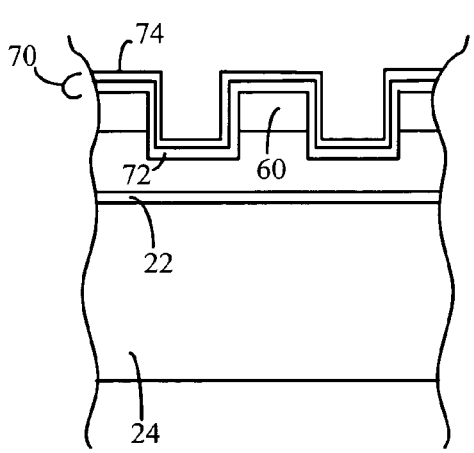

Suitable masks for the second mask 68 and/or the third mask 70 include, but are not limited to, photoresists. Other masks can be employed for the second and/or third mask 70. In some instances, the third mask is a hard mask. For instance, the third mask 70 can be generated from multiple layers. As an example, after removing the second mask 68 from the device precursor of FIG. 3B and FIG. 3C, an SiN layer 72 can be deposited on the device precursor followed by a SiO layer 74 to yield the device precursor of FIG. 5A and FIG. 5B. The portion of the SiO layer 74 protecting the grating recess region 62 can be removed to provide the device precursor of FIG. 5C and FIG. 5D. For instance, a photoresist and an etch that is selective for SiO over SiN can be employed to generate the device precursor of FIG. 5C and FIG. 5D. The resulting SiO layer 74 can serve as a mask for etching the SiN layer 72. For instance, a wet etch that is selective for the SiN layer 72 over the SiO layer can be employed to form the device precursor of FIG. 5E and FIG. 5F. As is evident from FIG. 5E and FIG. 5F, the SiO layer 74 and the SiN layer 72 together act as the third mask during the subsequent etching of the grating recess. The use of the SiN selective wet etch preserves the portions of the first mask that are exposed to etchant. As a result, the use of a third mask that includes the SiO layer 74 and the SiN layer 72 can provide for a smoother surfaces in the grating recess and can accordingly reduce optical loss. Additionally or alternately, the second mask can be formed of multiple layers. For instance, the second mask can be formed of a SiO layer over an SiN layer. The SiO layer and the SiN layer can be patterned as described in the context of FIG. 5A through FIG. 5F.

Examples of other masks that may be employed for the second mask 68 and/or the third mask 70 include or consist of metals and/or polyimides. Examples of suitable metals include aluminum. The type of mask selected can be influenced by the processing parameters that depending on the type of etch being used or to enable a viable process flow for the integration of additional components onto the same substrate as discussed above. Examples of parameters that can influence mask selection include etch angle, level of smoothness desired for etched materials, etch selectivity and feature resolution.

Although FIG. 2A through FIG. 4C illustrate the waveguides 26 formed before the grating recess 42, the waveguides 26 and grating recess 42 can be formed in reverse order. For instance, the second mask 68 and the third mask 70 can be formed in reverse of the order disclosed above. As an example, the third mask 70 disclosed above can be formed before the second mask 68. Further, the third mask 70 can be formed and removed before the second mask 68 is formed.

Although the optical above device is illustrated as having only waveguides, a free-space region, and an optical grating 34, only a portion of the optical device is illustrated. As a result, the optical device can include a variety of other components. In some instances, one or more of the waveguides 26 carry light signals to and/or from these other components. Examples of these components include, but are not limited to, demultiplexers, multiplexers, filters, switches, amplifiers, attenuators, lasers and other light sources, star couplers, and other waveguides. Additionally or alternatively, the device can include electrical components. For instance, the device can include electrical connections for applying a potential or current to a waveguide and/or for controlling other features on the optical device.

Although the optical grating 34 is described as operating like a demultiplexer, the optical grating can be operated in reverse as a multiplexer. For instance, the output waveguides can be operated as input waveguides and the input waveguide can be operated as an output waveguide.

Other embodiments, combinations and modifications of this invention will occur readily to those of ordinary skill in the art in view of these teachings. Therefore, this invention is to be limited only by the following claims, which include all such embodiments and modifications when viewed in conjunction with the above specification and accompanying drawings.

The invention claimed is:

1. A method of forming an optical device, comprising:
   forming a first mask on a device precursor having a light-transmitting medium positioned on a base,
      the first mask protecting a free space region of the device precursor while leaving exposed a grating recess region of the device precursor and leaving exposed trench regions of the device precursor,
         the grating recess region being a region of the light-transmitting medium where a grating recess is to be formed,
         the trench regions being regions of the light-transmitting medium where trenches are to be formed,
         the free space region spanning a gap between the trench regions and the grating recess region;
   forming the trenches while protecting the grating recess region or while protecting the grating recess, the trenches each including one or more waveguide surfaces, each waveguide surface defining a portion of one or more waveguides on the optical device;
   forming the grating recess while protecting the trench regions or while protecting the trenches, the grating recess including a reflective surface of an optical grating,
      the reflective surface configured to receive light signals from one or more of the waveguides and to reflect the received light signals such that the light signals are demultiplexed as the light signals travel away from the reflective surface,
      a portion of the waveguides configured to receive the demultiplexed light signals,
      the waveguide surfaces extending a different depth into the light-transmitting medium than the reflective surface extends into the light-transmitting medium; and
   wherein the first mask is present on the device while forming the grating recess and also while forming the trench regions.

2. The method of claim 1, wherein forming the grating recess includes etching the light-transmitting medium and forming the trenches includes etching the light-transmitting medium.

3. The method of claim 1, wherein forming the grating recess while protecting the trench regions or while protecting the trenches includes forming a second mask on the device precursor,
   at least a portion of the second mask being formed over the first mask, and
   the second mask protecting the trench regions or the trenches.

4. The method of claim 1, wherein the optical grating is an echelle grating.

5. The method of claim 1, wherein forming the trenches while protecting the grating recess region or while protecting the grating recess includes forming a second mask on the device precursor,
   at least a portion of the second mask being formed over the first mask, and
   the second mask protecting the grating recess region or protecting the grating recess.

6. The method of claim 5, wherein the second mask includes a metal or a polyimide.

7. The method of claim 1, wherein
   forming the trenches while protecting the grating recess region or while protecting the grating recess includes forming a second mask on the device precursor,
      at least a portion of the second mask being formed over the first mask, and
      the second mask protecting the grating recess region or protecting the grating recess; and
   forming the grating recess while protecting the trench regions or while protecting the trenches includes forming a third mask on the device precursor,
      at least a portion of the third mask being formed over the first mask, and
      the third mask protecting the trench regions or the trenches.

8. The method of claim 7, wherein the third mask includes a metal or a polyimide.

9. The method of claim 7, further comprising, removing the second mask before forming the third mask.

10. The method of claim 7, further comprising, removing the third mask before forming the second mask.

11. The method of claim 7, wherein forming the grating recess includes etching the grating recess into the light-transmitting medium and forming the trenches includes etching the trenches into the light-transmitting medium.

12. The method of claim 7, wherein the third mask includes a hard mask.

13. The method of claim 12, wherein the third mask includes a layer of silica over a layer of nitride.

14. The method of claim 13, wherein the edges of silica layer are aligned with the edges of the nitride layer.

15. The method of claim 13, wherein forming the third mask includes performing a wet etch of the nitride layer, the wet etch being selective for the nitride layer over the silica layer.

* * * * *